(12) United States Patent
Condemine

(10) Patent No.: US 7,299,366 B2
(45) Date of Patent: Nov. 20, 2007

(54) SECURE SOFTWARE CUSTOMIZATION FOR SMARTCARD

(75) Inventor: Olivier Condemine, Paris Cedex (FR)

(73) Assignee: Nagra Thomson Licensing, Boulogne-Billancourt (FR)

( * ) Notice: Subject to any disclaimer, the term of this patent is extended or adjusted under 35 U.S.C. 154(b) by 671 days.

(21) Appl. No.: 10/464,240

(22) Filed: Jun. 18, 2003

(65) Prior Publication Data

US 2003/0236989 A1 Dec. 25, 2003

(30) Foreign Application Priority Data

Jun. 24, 2002 (EP) .................... 02291568

(51) Int. Cl.
*G06F 11/30* (2006.01)
*G06F 12/14* (2006.01)
*H04L 9/32* (2006.01)

(52) U.S. Cl. .................... 713/193; 713/172; 726/9; 726/20

(58) Field of Classification Search ................ 713/193, 713/172; 726/9, 20
See application file for complete search history.

(56) References Cited

U.S. PATENT DOCUMENTS 4,734,569 A 3/1988 Kawana et al. ............. 235/487
6,317,832 B1* 11/2001 Everett et al. ............. 713/172
6,328,217 B1* 12/2001 Everett et al. ............. 235/492
6,385,723 B1 5/2002 Richards .................... 713/160
2005/0154902 A1* 7/2005 Evans ....................... 713/189

FOREIGN PATENT DOCUMENTS

EP 949595 A2 * 10/1999

OTHER PUBLICATIONS

European Search Report dated May 19, 2003.

* cited by examiner

*Primary Examiner*—Gilberto Barron, Jr.
*Assistant Examiner*—Samson Lemma
(74) *Attorney, Agent, or Firm*—Osha Liang LLP

(57) ABSTRACT

The customizing of a smartcard chip with a complete software begins with masking a smartcard chip by storing a first part of the software. The first part of the software, when executed, is enabled to input unlocking data at an input port of the smartcard chip, to use the unlocking data to decrypt encrypted data stored in the smartcard, and to store the decrypted data in the smartcard memory. Masking of the smartcard chip further comprises storing encrypted customization software. The customization software, when executed, is enabled to input data and to store the input data in the smartcard memory. After decrypting and executing the customization software; the second part of the software is input and stored in the smartcard, enabling the whole software on the smartcard.

12 Claims, 3 Drawing Sheets

ISSUER MODE

CUSTOMISATION MODE

SECURE SOFTWARE CUSTOMIZATION FOR SMARTCARD

CROSS-REFERENCE TO RELATED APPLICATIONS

This application claims priority from European Patent application EP02291568, with a filing date of Jun. 24, 2002.

BACKGROUND OF INVENTION

1. Field of the Invention

The invention relates generally to smartcards and more particularly to a process for securely customizing a smartcard chip with software.

2. Background Art

Production Process

A production process for customizing a smartcard with software generally comprises 4 phases: masking, pre-customization, card mounting and customization.

Referring to FIG. 1, a smartcard chip 100 is schematically represented. The smartcard chip 100 carries a Read Only Memory (ROM) module, an EEPROM module of rewritable memory, a Random Access Memory (RAM), a Central Processing Unit (CPU) and an Input/Output (IO) interface for communication of data.

Masking and Pre-customization

During the masking process, a client wishes to obtain a smartcard that contains a specific software and pre-customization information in the smartcard chip's memories (ROM, EEPROM). The software is generally at least partly stored in the appropriate memory by the chip manufacturer at the issue of a wafer manufacturing process by means of a process known as masking. The client provides the chip manufacturer with the software to store into ROM and with pre-customization information to store into EEPROM. The chip manufacturer performs the masking process by which the software and pre-customization information are stored as appropriate.

The pre-customization information stored in EEPROM generally corresponds to a transport key that is part of a strategy to prevent fraudulous use of the masked smartcard chip. The transport key is required as an input at a first execution of the software contained in the ROM in order to render the software fully operational. In other words, the software stored in the ROM is protected, since it may not be executed properly without knowing the transport key.

The transport key may only be recovered from EEPROM using a Security Access Module (SAM). Hence the masked smartcard chip is effectively useless for a potential thief. Generally the masked chip may merely receive and execute a limited number of commands without knowing the transport key, including for example a RESET command or an electrical test command of the chip.

After the masking process, the smartcard chip with the software corresponds to specifications of the client, i.e., the smartcard chip may receive and process commands as specified for the client's product provided the transport key is available.

Card Mounting and Customization

The manufacturer sends masked smartcard chips on a wafer to a card mounter who mounts the smartcard chips on smartcard supports. The card mounter performs all final process steps to obtain a smartcard. These final process steps may included printing a pattern on the smartcard and customization of the chip according to client's instructions. Customization of the chip starts with an electrical test of the chip and may comprise implementing additional commands in the memories of the chip.

In order to implement additional commands on the chip it is necessary to execute the software which enables commands for writing data to the chip memories. The card mounter recovers the transport key from the EEPROM by means of a Security Access Module (SAM) and uses the key to execute the software stored in ROM and thereby access commands to write the additional commands in memory.

There may be a further customization step to perform by the client. In this case the client receives the smartcards from the card mounter and uses a SAM to recover the transport key. The latter is used to execute the software in a similar way as was done by the card mounter and to subsequently write custom information into chip memories.

The described process of masking suffers a security problem in that both the entire software and the secret transport key are provided to the chip manufacturer by the client. In case the secret transport key is misused by the manufacturer or stolen from the manufacturer in view of executing the software, the masked chip may potentially be used and/or sold illegally and cause damages to the client.

In addition there is a security problem which occurs when the card mounter recovers the transport key. Here also the transport key may potentially be misused.

Furthermore there is a risk that the software code is misused by the manufacturer or stolen from the manufacturer, and that illegal copies of the software be sold, thereby causing damages to the client.

SUMMARY OF INVENTION

In a first aspect the invention provides a smartcard chip comprising an input device, and a first memory having decrypting software permanently stored therein. The smartcard chip further comprises a second memory having customization software stored therein, wherein the customization software is encrypted with an unlocking key. Execution means allow to input the unlocking key via the input device, execute the decrypting software, and decrypt the customization software.

Preferably the first memory is a Read Only Memory device and the second memory a Rewritable memory device.

In a second aspect the invention provides a method for customizing software of a smartcard chip, comprising executing a decrypting software stored in the smartcard chip, inputting unlocking data, and applying the unlocking data to a decrypting of customization software stored in the smartcard chip. The decrypted customization software is stored in the smartcard chip and executed to input smartcard software and store the smartcard software into a memory of the smartcard chip.

Preferably the unlocking data comprises an unlocking key and a hash code. The unlocking key is applied with the decrypting software in the decrypting of the customization software. A customization hash code for the decrypted customization software is computed and the hash code compared with the customization hash code. The customization software is executed only if the hash code matches the customization hash code.

In a third aspect the invention provides a method for customizing a smartcard chip with a software comprising masking a smartcard chip by storing a first part of the software. The first part of the software, when executed, is enabled to input unlocking data at an input port of the smartcard chip, to use the unlocking data to decrypt encrypted data stored in the smartcard memory, and to store the decrypted data in the smartcard memory. The smartcard chip is further masked by storing encrypted customization software. The customization software, when executed, is enabled to input data and to store the input data in the smartcard memory.

Preferably the first part of the software is executed. The inventive method comprises inputting the unlocking data, decrypting the customization software, storing the decrypted customization software in the smartcard memory, and executing the customization software to enable input of data and storing thereof. A second part of the software is input at the input port, the second part of the software being complementary to the first part of the software to obtain the whole software. The input second part of the software is stored into the smartcard memory.

Other aspects and advantages of the invention will be apparent from the following description and the appended claims.

BRIEF DESCRIPTION OF DRAWINGS

The invention will now be described in greater detail with reference to the accompanying drawings, in which.

DETAILED DESCRIPTION

Software Provided to Manufacturer for Masking

According to the invention, the client may deliver only a part of the software to be masked in ROM to the manufacturer. In addition the client provides pre-customization information which is intended to be stored in EEPROM.

The delivered part of software is designed to accept only one single command when executed, i.e. to accept unlocking data. One advantage of providing a part of the software only is that the masked chip does not contain a final software which responds to the client specifications, as was the case in prior art.

Hence the risk of producing illegal copies of the full software according to client's specifications departing from software provided to the manufacturer is practically eliminated, because the manufacturer possesses only a part of the software. This reduces the degree of trust that must be attributed to the manufacturer.

The pre-customization information intended to be stored in EEPROM corresponds to customization software encrypted using an unlocking key. The customization software may be obtained by decrypting the pre-customization information. The latter decrypting requires to execute the delivered part of the software and thus to input the unlocking key which is known to the client only.

This way the manufacturer never gets to know the unlocking key which is required for executing the only available command of the part of software. The risk of fraudulous manipulation of the unlocking key is considerably reduced. The risk of theft of the software and pre-customization information is virtually eliminated since due to the unavailability of the unlocking key, the software may not be executed.

It is understood that the masked chip with the part of software and the encrypted customization software, may receive and execute a limited number of service commands that do not require the unlocking key, including for example a RESET command, a command for writing a serial number or an electrical test command of the chip. These commands are necessary to test the smartcard between various steps of the production process. These commands are not specific to the software provided by the client.

The chip is masked using conventional technology as is well known in the art.

Figure 1:
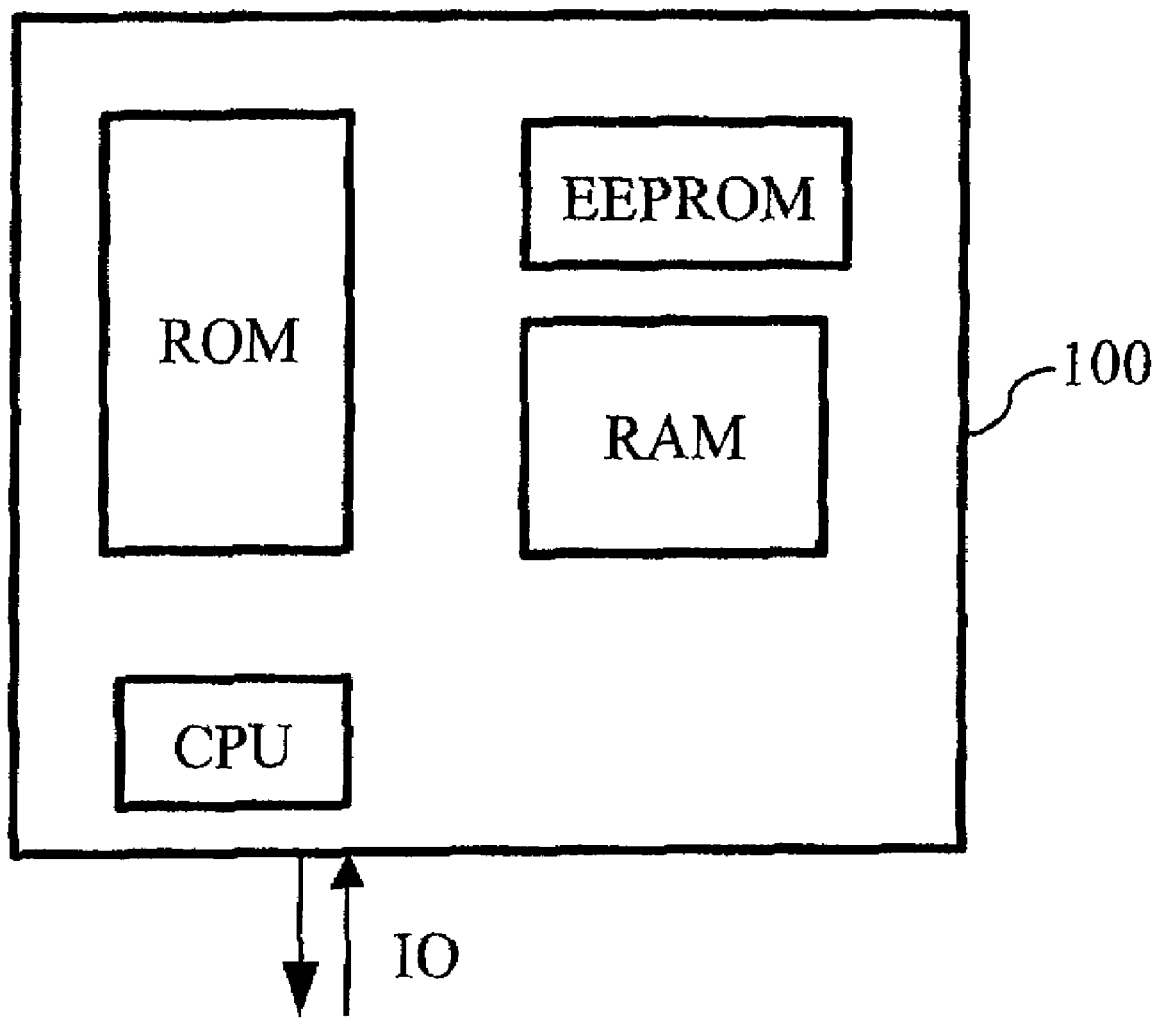
FIG. 1 shows a general overview of an example of a smartcard chip, FIG. 2 contains an example schematic representation of smartcard memory in an issuer mode, FIG. 3 contains an example schematic representation of smartcard memory in a customization mode, FIG. 4 contains a flowchart illustrating an embodiment of a process of the smartcard according to the invention.
Figure 2:
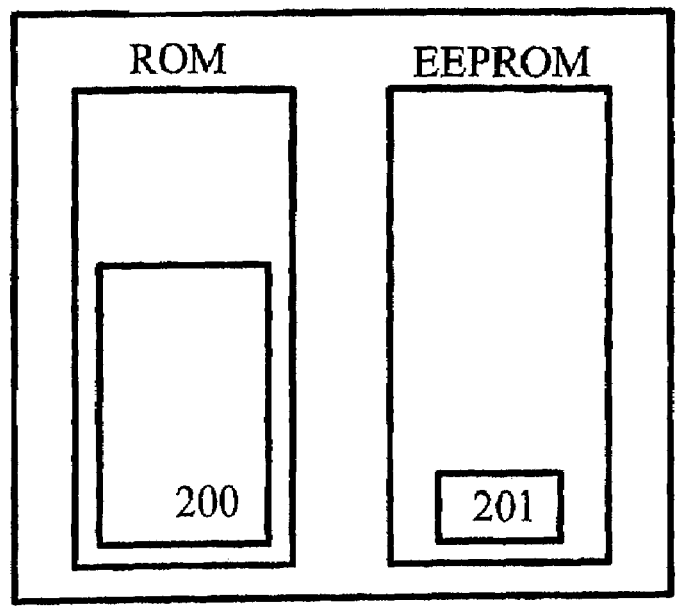

FIG. 2 contains a schematic representation of the ROM and EEPROM on a masked chip. The ROM contains the delivered part of software 200. The EEPROM contains pre-customization information, i.e., the customization software 201 which is encrypted.

The masked chip leaves the manufacturer is an Issuer mode, i.e., a mode in which the chip may only receive commands that do not require the unlocking key and execute one command which requires the unlocking key ; the masked chip is transferred to a card mounter.

Card Mounter Processing

The card mounter receives a wafer carrying masked smartcard chips from the manufacturer. The chips are separated from the wafer and mounted on a smartcard support is a manner well known from prior art.

The only executable commands that the card mounter may send to the smartcard chip and execute, are the ones which are accepted in the Issuer mode and do not require the unlocking key. Typically the card mounter will perform an electrical test of the chip in order to check if the chip is defect and must be discarded from mounting.

The card mounter may at the request of the client use the appropriate command to write a serial number to the smartcard chip.

The card mounter may not perform any other manipulation of the software stored in the ROM and EEPROM of the chip, since this would require the knowledge of the unlocking key. Consequently the smartcard leaves the card mounter with the chip being in the same state as when it was received by the card mounter.

Optionally the card mounter may perform any steps of personalisation of the smartcard support itself, e.g., such as printing on the card surface.

The processing by the card mounter is greatly simplified as compared to prior art since no SAM is used anymore.

Final Customization of the Smartcard

The smartcard in Issuer mode needs to undergo a number of processing steps in order to be customized and to become operational for an end user. These customization steps are typically performed by the client who detains the unlocking key.

The customization steps comprise at least the following: executing the masked software and adding missing parts of the software to the masked part of the software in order to obtain the final software according to client specifications. During the customization steps, the smartcard will exit the Issuer mode and switch to Customization and User modes. These will now be described in more detail.

It is understood that the smartcard is connected to client's control apparatus and may receive signals through its IO interface. The technology for sending and receiving signals, and for handling data in memories of the smartcard is commonly known in the state of the art and will not be described here any further.

Enabling Customization

The only command (apart from the service commands) which is accepted when executing the masked part of software 200 in ROM requires the input of the unlocking key.

After inputting the unlocking key, the software processes the pre-customization information 201 in the EEPROM by decrypting it using the unlocking key and obtaining the customization software contained therein.

Furthermore a hash code is required for obtaining the customization software. The hash code is used to verify an integrity of the customization software code. The hash code is input during execution of the masked part of software 200 and compared to a customization hash code resulting from the decrypted customization software. In case the hash code is different from the customization hash code, processing of the pre-customization information is interrupted and the smartcard returns in an initial Issuer mode.

Figure 3:
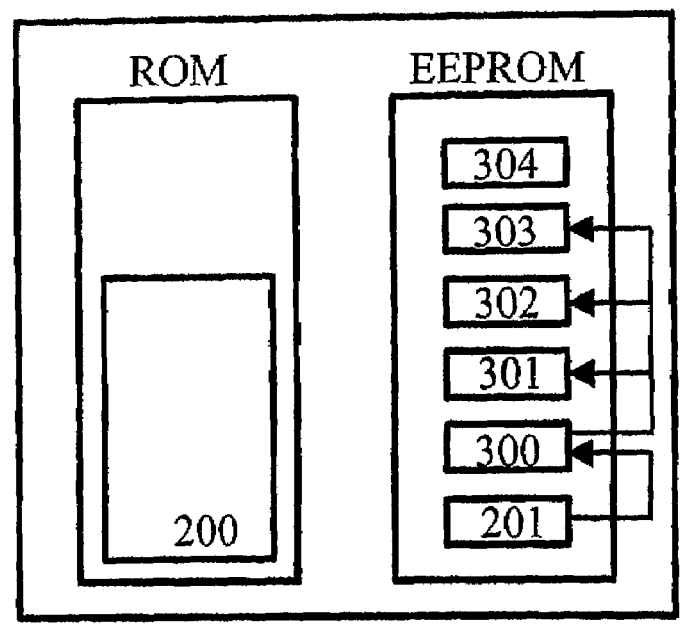

In case the hash code matches the customization hash code, the customization software in stored in a block 300 of the EEPROM (see FIG. 3).

Alternatively the customization software could also be stored in any other available memory such as the RAM memory of the smartcard.

At this stage the smartcard is said to be in the Customization mode.

Execution of the Customization Software

The execution of the Customization software is part of the customization that takes place while the smartcard is in the Customization mode. The Customization software at least allows to accept input code or data from the client and to write this code or data into EEPROM. This allows to add software and complete the part of the software that is masked in the ROM and EEPROM.

The customization software may, for example, input following types of data:

a vector table 301. This data contains information of address locations in ROM or other parts of the smartcard memory where executable commands may be found. This may among others concern ROM addresses of the software 200 at which commands were inserted during the masking. The vector table 301 therewith allows to effectively execute the software 200;

additional software 302. This data completes the initially masked software 200 and brings the smartcard software in conformity with clients specifications. The additional software may for example contain confidential code which should not be disclosed to the chip manufacturer;

software updates 303. This data relates to amendments brought to clients software. The software updates 303 enable an efficient way of modifying the software after masking of the chip. In prior art the whole software was masked in ROM and could not be modified after leaving the chip manufacturer. In a similar fashion, the software updates 303 may add functionality by implementing new commands. Hence a card may easily be customized by the client according to technical requirements or to customer requirements, without modifying the initial masking process. This provides a great amount of flexibility for the client.

Entering User Mode mode finishes by entering the User mode. This is the last step of the Customization mode at which a determined command stored in ROM, and possibly activated during the customization mode, is executed. The determined command erases the customization information 201 and the customization software 300. After execution of the determined command it becomes impossible to write new data into EEPROM, except for operations which are managed by applications resident on the smartcard.

In User mode the smartcard is ready to be dispatched to final users.

Optionally the client may have designed the software on the smartcard to enable an access for customization in User mode by using the process known from prior art. This type of customization may for example require a SAM.

Figure 4:
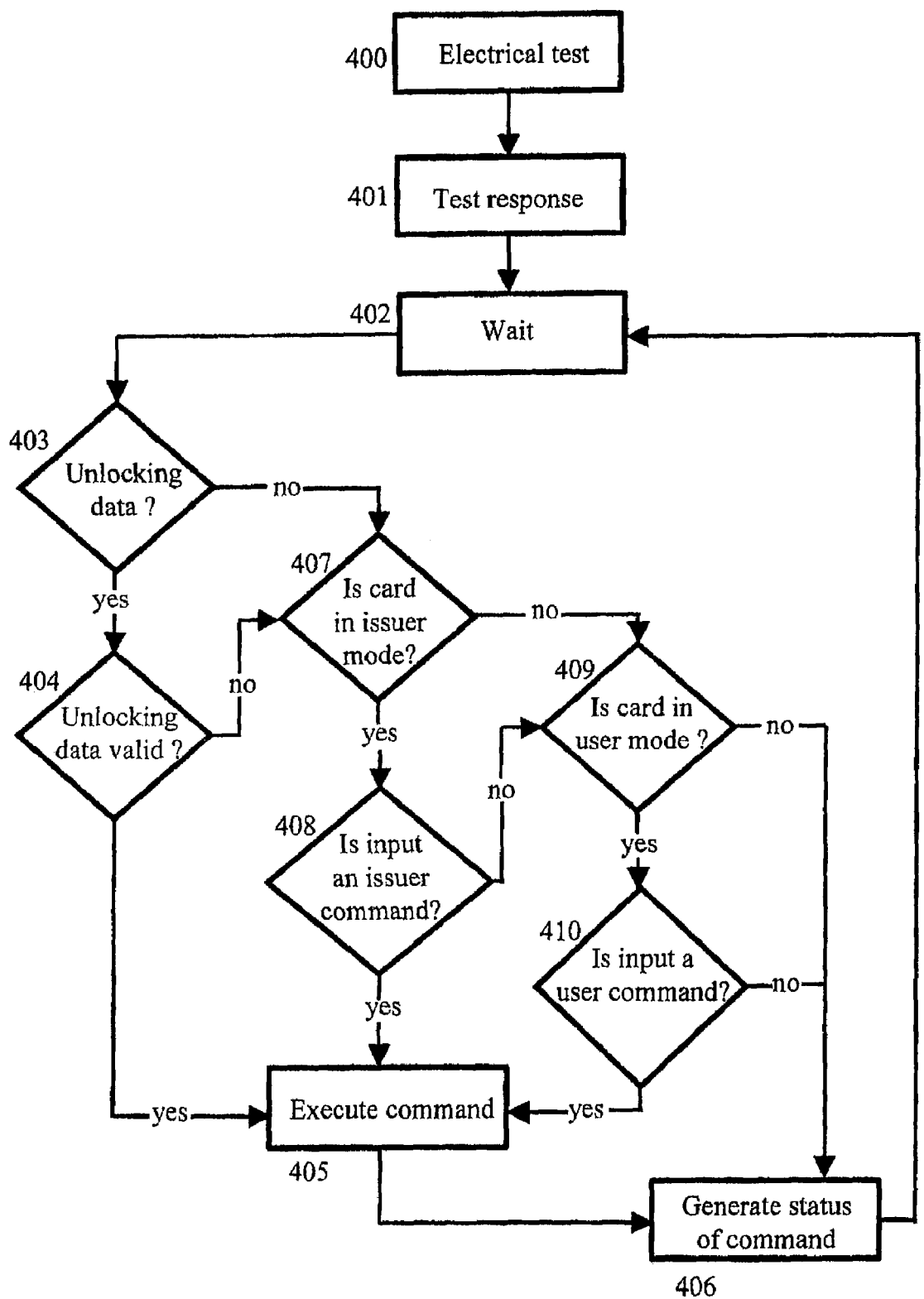

Referring to FIG. 4, a flow chart gives an overview of specifications that apply to input received by the smartcard in the Issuer and/or User modes. The card is initially tested electrically in boxes 400-401, and thereafter goes into wait cycles, expecting an input in box 402. After receiving an input it is checked in 403 whether the input corresponds to an unlocking data, i.e. unlocking key and hash code. If this is the case a further check 404 is performed to verify that the unlocking data is valid, e.g. a decrypting of the pre-customization information is attempted and the hash code is compared to the resulting customization hash code (not shown in FIG. 4). In case the hash codes match, the corresponding command is further processed in 404. In this particular case, the customization software is stored into memory (not shown). A status of command execution is generated in 406 and the card returns to execution of box 402.

If in box 404, the unlocking data is found to be invalid, or if in box 403 the input is not identified as unlocking data, the smartcard appropriately performs checks 407-410 to determine which mode the card is in (Issuer or User) and if the input correspond to a valid command of these modes. If at all possible, the command corresponding to the input is executed in 405. In all cases the processing goes through the generation of a status of command execution in box 406 and subsequently to the execution of box 402, i.e., to wait cycles.

Referring again to FIG. 3, the current status of the mode, i.e., Issuer, Customization or User may be stored in a part 304 of the EEPROM memory dedicated to this information. It is possible to improve the overall security level of the customization process by using a One Time Programming type of memory for part 304, because every step of the customization process leaves a permanent trace in the chip OTP memory. The OTP memory may be checked by the executed customization software to make sure that a customization step is only undertaken as planned, e.g., customization mode may only be entered once after Issuer mode.

As compared to prior art the inventive method described herein eliminates the need for a SAM at customization of the card by the manufacturer and/or the card mounter. Hence the inventive method appears to reduce the complexity of work to be done by the manufacturer and/or the card mounter.

The invention may be used in particular also with smartcard chips that comprise hardware specifically designed for the customer as opposed to a standard design. The invention makes the smartcard chip useless as long as it has not been customized by the client. Hence the risk that the smartcard is stolen from the manufacturer is very low since the card is of no use without the unlocking key. This improves protection of the specific hardware design against theft.

Having described preferred embodiments of the invention with reference to the accompanying drawings, it is to be understood that the invention is not limited to these precise embodiments and that various changes and modifications could be effected therein by a person skilled in the art without departing from the spirit or scope of the invention as defined in the appended claims.

What is claimed is:

1. A smartcard chip for use in the production of a customized smartcard, the smartcard chip comprising:
   an input device configured to obtain input from a client comprising an unlocking key;
   a first memory having a masked software portion permanently stored therein, wherein the masked software, when executed, is configured to accept a command comprising the unlocking key;
   a second memory having customization software stored therein, wherein the customization software is encrypted with the unlocking key; and
   a processor configured to:
      execute the masked software,
      accept the unlocking key via the input device, and
      decrypt and execute the customization software using the inputted unlocking key,
      wherein the customization software, when executed, allows the client to input at least one portion of software that is added to the masked software portion to obtain a completed software,
      wherein the completed software customizes the smartcard for the client.

2. The smartcard chip according to claim 1, in which the first memory is a Read Only Memory device and the second memory a rewritable memory device.

3. A method for customizing a smartcard chip with a software during production of a customized smartcard comprising:
   masking the smartcard chip by storing a first masked software portion in a first memory and an encrypted customization software in a second memory,
   wherein the first masked software portion, when executed, is configured to accept a command comprising an unlocking key;
   executing the first part of the masked software to obtain the unlocking key from a client;
   decrypting and executing the encrypted customization software using the unlocking key, wherein the customization software, when executed, allows the client to input a second portion of software that is added to the masked software portion to obtain a completed software, and
   wherein the completed software customizes the smartcard for the client.

4. The method for customizing according to claim 3, further comprising:
   storing the decrypted customization software in the smartcard memory; and
   storing the second portion of the software into the first memory.

5. The method for customizing according to claim 4, further comprising:
   erasing the encrypted and the decrypted customization software from the second memory.

6. The method for customizing according to claim 4, further comprising:
   executing the completed software.

7. The method for customizing according to claim 5, further comprising: executing the completed software.

8. The method for customizing according to claim 4, further comprising:
   inputting at the input port software amendments to the first masked software portion;
   storing the input software amendments in the second memory.

9. The method for customizing according to claim 3, further comprising:
   mounting the smartcard chip on a smartcard support.

10. A smartcard comprising a smartcard chip according to claim 1.

11. A smartcard chip for use in the production of a customized smartcard, the smartcard chip comprising:
    an input device configured to obtain input from a client comprising an unlocking key;
    a first memory having a first masked software permanently stored therein, wherein the first masked software, when executed, is configured to accept a command comprising the unlocking key;
    a second memory having an encrypted customization software stored therein, wherein the customization software is encrypted with the unlocking key; and
    a processor configured to:
    execute the masked portion of the software,
    accept the unlocking key via the input device, and
    decrypt and execute the encrypted customization software,
       wherein the first software comprises only part of the software of the customized smartcard, and the customization software is adapted to, during execution, accept code or data via the input means, and write the code or data into the second memory, the code or data being complementary to the first masked software, to obtain a completed software, wherein the completed software customizes the smartcard for the client.

12. The smartcard chip according to claim 11, wherein the first masked software without the unlocking key only accepts service commands, and with the unlocking key only accepts a command to decrypt the customization software.

* * * * *